(12) United States Patent
Grady et al.

(10) Patent No.: US 9,165,456 B2
(45) Date of Patent: Oct. 20, 2015

(54) SYSTEMS AND METHODS FOR DISTRIBUTING DATA WITHIN A MESH NETWORK

(75) Inventors: Robert Henry Grady, Rumford, RI (US); Dale McLeod Magley, Franklin, MA (US); William Charles Shoesmith, Marion, MA (US)

(73) Assignee: Mueller International, LLC, Atlanta, GA (US)

( * ) Notice: Subject to any disclaimer, the term of this patent is extended or adjusted under 35 U.S.C. 154(b) by 542 days.

(21) Appl. No.: 13/556,272

(22) Filed: Jul. 24, 2012

(65) Prior Publication Data

US 2014/0028468 A1 Jan. 30, 2014

(51) Int. Cl.
*G08C 15/06* (2006.01)
*G08C 15/00* (2006.01)
*H04Q 9/00* (2006.01)
*G01D 4/00* (2006.01)

(52) U.S. Cl.
CPC ............... *G08C 15/00* (2013.01); *H04Q 9/00* (2013.01); *G01D 4/004* (2013.01); *H04Q 2209/25* (2013.01); *H04Q 2209/60* (2013.01); *Y02B 90/242* (2013.01); *Y04S 20/322* (2013.01)

(58) Field of Classification Search
CPC ....... Y04S 20/30; Y04S 20/32; Y04S 20/322; Y04S 20/42; Y04S 20/48; H04Q 2209/60; G01D 4/00; G01D 4/002; G01D 4/004; G01D 4/02
USPC ................ 340/870.02, 870.03; 717/168–173; 713/100
See application file for complete search history.

(56) References Cited

U.S. PATENT DOCUMENTS

| 8,572,600 | B2 * | 10/2013 | Chung et al. | 717/172 |
| 2003/0191955 | A1 | 10/2003 | Wagner et al. | |
| 2005/0035877 | A1 * | 2/2005 | Kim | 340/870.02 |
| 2006/0044723 | A1 * | 3/2006 | Beneditz et al. | 361/90 |
| 2007/0013547 | A1 | 1/2007 | Boaz | |
| 2008/0259844 | A1 | 10/2008 | Richeson et al. | |

(Continued)

FOREIGN PATENT DOCUMENTS

WO  2012069950  5/2012

OTHER PUBLICATIONS

Grady, Robert Henry; PCT Application entitled: Systems and Methods for Distributing Data Within a Mesh Network, having serial No. PCT/US13/51605, filed Jul. 23, 2013, 34 pgs.
Grady, Robert Henry; International Search Report and Written Opinion for serial No. PCT/US13/51605, filed Jul. 23, 2013, mailed Oct. 16, 2013, 12 pgs.

(Continued)

*Primary Examiner* — Steven Lim
*Assistant Examiner* — Ryan Sherwin
(74) *Attorney, Agent, or Firm* — Taylor English Duma LLP

(57) ABSTRACT

Systems and methods for distributing a firmware upgrade within a mesh network are provided. In one implementation, a firmware upgrade distributing system comprises a utility provider, which is configured to provide utility services to a plurality of customers, a plurality of meters, and a plurality of nodes. Each meter is configured to measure utility usage data of a respective customer. The nodes are configured to transmit the utility usage data from the plurality of meters to the utility provider. When at least one of the meters is scheduled to receive a firmware upgrade, the utility provider is configured to forward the firmware upgrade to at least one of the plurality of nodes. The at least one node is configured to receive and store the firmware upgrade and, after storing the firmware upgrade, is further configured to forward the firmware upgrade to at least one of the plurality of meters.

21 Claims, 7 Drawing Sheets

(56) References Cited

U.S. PATENT DOCUMENTS

| | | |
|---|---|---|
| 2008/0284855 A1* | 11/2008 | Umeyama et al. ......... 348/207.1 |
| 2009/0222828 A1 | 9/2009 | Lefevre et al. |
| 2011/0216841 A1 | 9/2011 | Luby et al. |
| 2012/0131324 A1 | 5/2012 | Ansari et al. |

OTHER PUBLICATIONS

Grady, Robert Henry; International Preliminary Report on Patentability for serial No. PCT/US13/51605, filed Jul. 23, 2013, mailed Feb. 5, 2015, 10 pgs.

* cited by examiner

SYSTEMS AND METHODS FOR DISTRIBUTING DATA WITHIN A MESH NETWORK

TECHNICAL FIELD

The present disclosure generally relates to mesh networks, and more particularly relates to distributing data within mesh networks.

BACKGROUND

Typically, utility meters (e.g., gas meters, water meters, electricity meters, etc.) are read manually by meter readers who are employees or contractors of the various utility providers. Manual meter reading represents a significant cost to a typical utility provider. However, with the advent of wireless technology including mesh networking, utility providers have sought methods and systems for remote reading of water meters and even the remote control of water supply valves.

Advanced Metering Infrastructure (AMI) or Advanced Metering Management (AMM) are systems that measure, collect and analyze utility data using advanced metering devices such as water meters, gas meters, and electricity meters. In addition to measuring the various utilities, the advanced metering devices are also configured with communication circuitry, enabling the metering devices to transmit and receive data through the AMI network. In a typical configuration, an advanced metering device (e.g., an advanced water meter) measures and collects usage data (e.g., water usage data) at a customer's location. The metering device then uses a communication interface to transmit data to a parent node up the mesh network, often in response to the parent node's request for such information. The meter data can be transmitted up the mesh network to a collector associated with the utility provider. In this way, the utility providers may remotely "read" customer usage data for billing purposes.

SUMMARY

The present disclosure relates generally to mesh networks and more specifically to systems and methods for distributing data (including firmware upgrades) within the mesh networks. According to one implementation, a system for distributing firmware upgrades comprises a utility provider that is configured to provide utility services to a plurality of customers. The system also includes a plurality of meters and a plurality of intermediate nodes, wherein each meter is configured to measure utility usage data of a respective customer. The intermediate nodes are configured to transmit the utility usage data from the plurality of meters to the utility provider through the mesh network. When at least one of the meters (or at least one of the intermediate nodes) is scheduled to receive a firmware upgrade, the utility provider is configured to forward the firmware upgrade to at least one of the plurality of intermediate nodes. The at least one intermediate node is configured to receive and store the firmware upgrade and, after storing the firmware upgrade, is further configured to forward the firmware upgrade to at least one of the plurality of meters.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
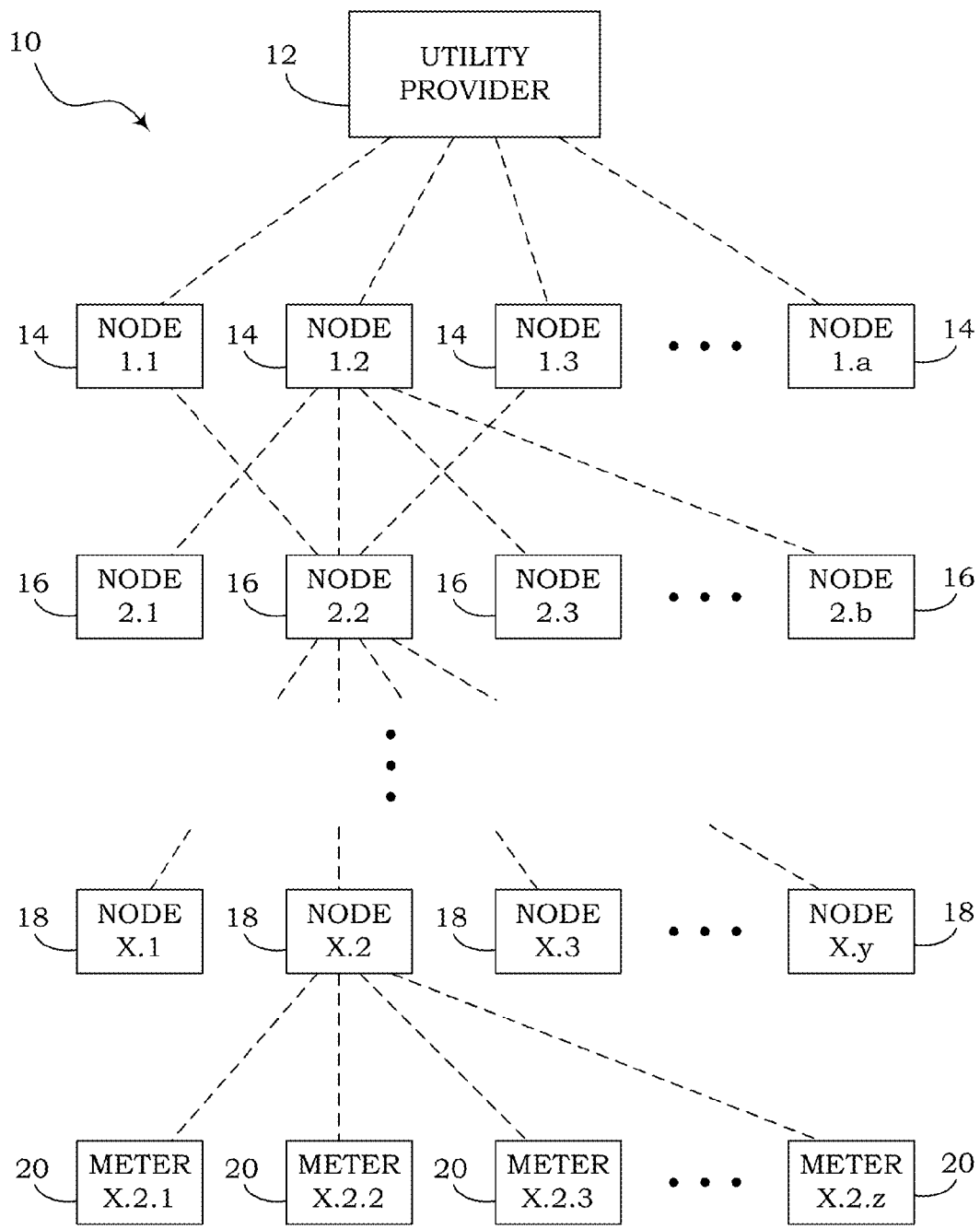
FIG. 1 is a block diagram illustrating an AMI mesh network according to various implementations of the present disclosure.

The present disclosure describes systems and methods for communicating information within a mesh network. Mesh networks and mesh networking devices may be utilized with Advanced Metering Infrastructure (AMI) systems for measuring utility data at multiple locations and communicating the readings to a utility provider. In response to receiving the utility data, the utility provider can determine billing information for its customers. Utility measurements are performed by various types of meters, such as electric meters, water meters, gas meters, etc. In mesh networks, the meters are configured to forward their readings to the utility provider either in a direct manner or via one or more intermediate nodes. Since meters may be dispersed widely throughout a region, they often require intermediate nodes for forwarding the information to the utility provider.

Utility companies, in order to bill their customers, must periodically determine customer usage by taking meter readings. To facilitate this process and to reduce costs to the utility companies, utility meters in the present disclosure may transmit usage data wirelessly through a network, such as a mesh network, back to the utility provider.

In addition to transmitting information from the meters to the utility provider, occasionally information may be transmitted from the utility provider to the meters. For example, when the utility provider determines that some or all of the meters or intermediate nodes in the mesh network need to be upgraded, firmware upgrade processes, as mentioned in the present disclosure, may be initiated. With possibly thousands of meters or nodes in a mesh network, it is desirable to minimize the overall amount of communication traffic in order to allow the system to operate efficiently. Also, since some meters and/or nodes may be powered by batteries, minimizing the use of the meters and nodes may be desired in order to prolong the life of the batteries. Reducing battery usage time to extend battery life can therefore reduce the amount of maintenance that must be performed on the metering devices.

While the present disclosure relates to mesh networking, as those having ordinary skill in the art will recognize, the present disclosure may be utilized in other types of networking environments, such as point-to-point FHSS networks as well. Within a mesh network, "parent" and "child" nodes may have a predefined relationship based on hierarchy. In some embodiments, the mesh network may not necessarily have a firmly established hierarchy but may allow the nodes to identify an acceptable path to the host via any number of intermediate nodes. Although the present disclosure describes a single parent to multiple child relationship, it should be understood that multiple parents may exist within the same network. Further, a child may have multiple parents. In various embodiments, a single parent may be paired with a single child. As an example, child nodes may represent individual customers' utility meters while a parent node may represent a primary data collection device responsible for collecting data from and sending data to each child device.

FIG. 1 is a block diagram showing an embodiment of an AMI mesh network 10 in a hierarchical configuration. Although the AMI mesh network 10 may typically be distributed throughout a geographical region, the block diagram of FIG. 1 shows a hierarchy to emphasize the parent/child relationships among the various components. As illustrated, the AMI mesh network 10 includes a utility provider 12, a first level of intermediate nodes 14, a second level of intermediate nodes 16, a lowest level of intermediate nodes 18, and end nodes 20, which may be attached or otherwise communicatively connected to utility meters. In some embodiments, the intermediate nodes may be meters themselves or may be integrated with or connected to meters. Also, the end nodes 20 may further act as intermediate nodes to additional meters. In some embodiments, the intermediate nodes may be configured as stand-alone devices for assisting in the transfer of data between the utility provider 12 and end nodes 20. The AMI mesh network 10 may include any number of levels X of intermediate nodes between the utility provider 12 and the end nodes 20. Also, the number of levels between the end nodes 20 and the utility provider 12 is not necessarily the same for each meter 20. In addition, some of the intermediate nodes 14, 16, 18 may be configured as end nodes as well and may be capable of both measuring utility data and communicating with lower level intermediate nodes and/or meters.

The utility provider 12, acting as a parent, communicates directly with intermediate nodes 1.1, 1.2, 1.3, . . . 1.a of the first level of intermediate nodes 14, which may be defined as child nodes with respect to the utility provider 12, which may be defined as a parent node. Any number "a" of intermediate nodes 14 may be configured in the first level. Each of the intermediate nodes 14 in the first level may be configured as a parent to one or more intermediate nodes 16 in the second level and communicate directly with these intermediate nodes 16. The intermediate nodes 14 may have any number "b" of child nodes 16. In this example, the intermediate node 1.2 of the first level of nodes 14 has child nodes 2.1, 2.2, 2.3, . . . 2.b in the second level of intermediate nodes 16. This arrangement continues down the hierarchy to the lowest level of intermediate nodes 18, which may include any number "y" of intermediate nodes. Node X.2 is illustrated with a number "z" of end nodes 20, which are configured as children of intermediate node X.2. Further, each child node may have multiple parent nodes; for example, node 2.2 may have as its parent nodes 1.1, 1.2, and 1.3. The numbering shown in the various boxes of the nodes and meters is merely for illustrative purposes to express arbitrary or various numbers of levels of intermediate nodes and arbitrary or various numbers of child nodes/meters of each intermediate node.

The utility provider 12, intermediate nodes 14, 16, 18, and end nodes 20, according to various implementations, may comprise circuitry and functionality to enable radio frequency (RF) communication among the various components. The dashed lines shown in FIG. 1 may therefore represent RF communication channels between the different components. The configuration of components of the AMI mesh network 10 shown in FIG. 1 is merely one embodiment, and additional devices or alternative configurations may be used. The wireless communication between the devices 12, 14, 16, 18, and 20 may be active during some periods of time and may be inactive during other periods of time. Alternatively, any of the nodes may be connected together through wired connections.

The utility provider 12, or a server associated with the utility provider 12, may be configured to manage the relationships between the various intermediate nodes and meters. In some cases, the parent/child relationships may be changed as needed to more evenly distribute the child nodes among the parents. The utility provider 12 may maintain a table of child nodes of each intermediate node and those meters associated with the lowest-level intermediate nodes 18 in a child relationship. In some embodiments, the intermediate nodes themselves may automatically configure and/or re-configure their own parent/child relationships with one another.

Figure 2:
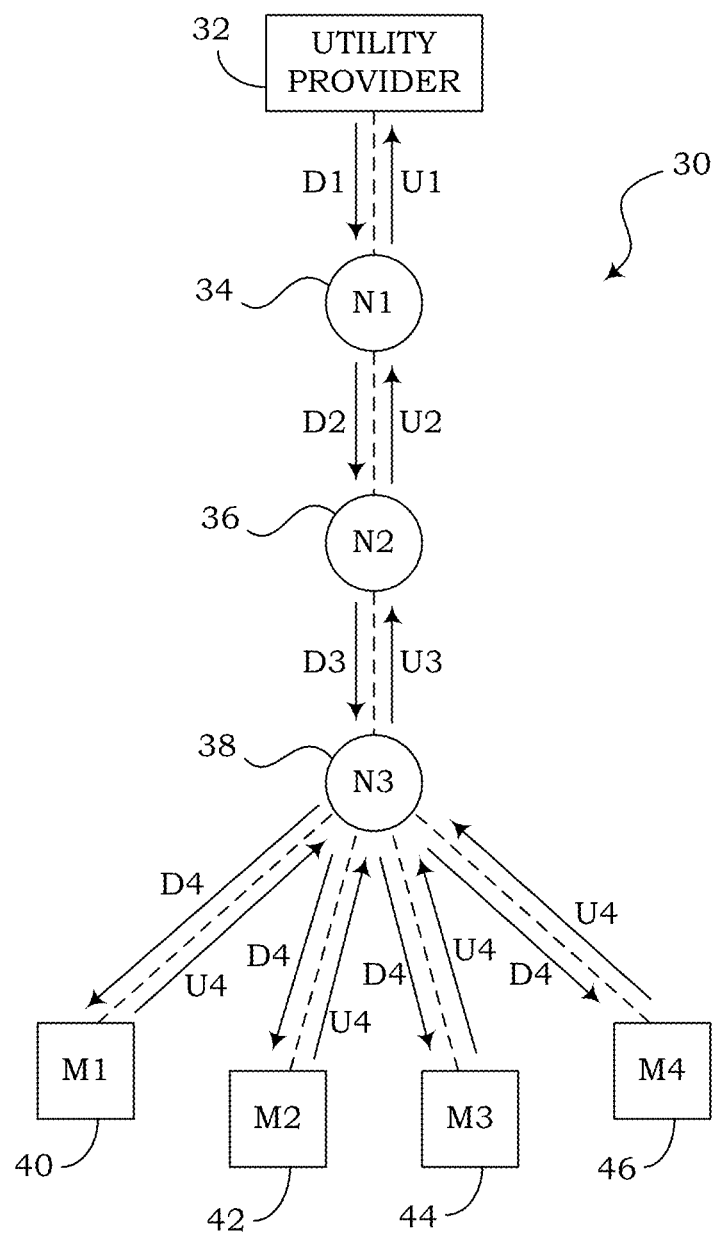
FIG. 2 is a block diagram illustrating a portion of an AMI mesh network according to various implementations of the present disclosure.

FIG. 2 is a block diagram showing an embodiment of a portion of another AMI mesh network 30 in a hierarchical configuration. In this embodiment, the AMI mesh network 30 includes a utility provider 32, a first intermediate node 34, a second intermediate node 36, a third intermediate node 38, a first meter 40, a second meter 42, a third meter 44, and a fourth meter 46. Thus, as illustrated in this example, the third intermediate node 38 is in a lowest level of intermediate nodes and communicates directly with four different meters 40, 42, 44, and 46. At times, firmware upgrades are forwarded to the intermediate nodes and the meters to update the nodes and the meters as needed in the AMI mesh network 30. Instead of sending employees to the large number of nodes and meters to install the firmware upgrades, the firmware upgrades can be communicated electronically through the AMI mesh network 30 from the top down.

Before the firmware upgrades are distributed to the nodes and the meters, the upgrade message is broken down into data packets, or blocks. For example, the firmware upgrade may be about 128 kilobytes in size and each data packet may be about 100 bytes. Hence, the firmware upgrade may be broken down into about 1,280 data packets. In applications other than distributing firmware upgrades, the AMI mesh networks 10, 30 may be configured in a sensor array network in which sensors capture certain types of readings, such as water flow, to create acoustic signature files, which may be about 10 kilobytes in size. These acoustic signature files may be broken down into data packets and distributed through the mesh network as mentioned herein.

According to a first embodiment for distributing firmware upgrades to the meters (or other types of data or file distribution throughout a mesh network), the entire firmware upgrade is communicated to one meter before it is sent to the next meter. This process is repeated individually for each meter until all meters scheduled for upgrade are upgraded. In this first embodiment, the process for upgrading the first meter 40 will be described. It should be understood that upgrading the other meters will involve practically the same steps. First, a first data packet of the firmware upgrade is transmitted from the utility provider 32 to the first intermediate node 34. The first intermediate node 34 then transmits the first data packet to the second intermediate node 36, and the second intermediate node 36 transmits the first data packet to the third intermediate node 38, which is the lowest-level intermediate node in this example. The third intermediate node 38 then transmits the first data packet to the first meter 40. The first meter 40 stores the first data packet and then sends an acknowledgement signal back up the hierarchy to indicate that the data packet was received. This acknowledgement signal is transmitted to the utility provider 32 via the third intermediate node 38, second intermediate node 36, and first intermediate node 34. This process is repeated for the remaining data packets. Assuming that there are 1,000 data packets in a firmware upgrade, the above process is repeated 1,000 times. This means that for each of the meters 40, 42, 44, and 46, there will be 2,000 transmissions (i.e., 1,000 data packet transmissions and 1,000 acknowledgement signal transmissions) between the utility provider 32 and the first intermediate node 34. Also, 2,000 transmissions will be made between the first intermediate node 34 and second intermediate node 36; 2,000 between intermediate nodes 36 and 38; and 2,000 between the third intermediate node 38 and the respective meter. Repeated for the four meters 40, 42, 44, and 46, there will be 8,000 transmissions between the utility provider 32 and the first intermediate node 34; 8,000 between the first intermediate node 34 and the second intermediate node 36; 8,000 between the second intermediate node 36 and the third intermediate node 38; and 8,000 between the third intermediate node 38 and the meters 40, 42, 44, and 46. This totals 32,000 transmissions.

In a preferred embodiment, the firmware upgrades are distributed in a manner in which the intermediate nodes (i.e., the first intermediate node 34, the second intermediate node 36, and the third intermediate node 38 in this example) are capable of storing the data packets from its parent until all data packets are received and then forwarding the data packets to its child or children. According to this embodiment, a first data packet is transmitted from the utility provider 32 to the first intermediate node 34. The first intermediate node 34 stores the first data packet and then sends an acknowledgement signal back to the utility provider 32 indicating that the data packet was received. Then, the process is repeated for the remaining data packets until all the data packets have been transmitted from the utility provider 32 to the first intermediate node 34 and the first intermediate node 34 has stored all the data packets making up the entire firmware upgrade.

Once the first intermediate node 34 receives and stores the entire firmware upgrade, the first intermediate node 34 transmits the first data packet to its child (i.e., the second intermediate node 36). The second intermediate node 36 stores the first data packet internally and sends an acknowledgement signal back to the first intermediate node 34 to indicate that the first data packet was received. Then, the first intermediate node 34 repeats the transmission for the remaining data packets of the firmware upgrade until all the data packets have been received and stored by the second intermediate node 36.

This process is then repeated between any other intermediate nodes, which, in this example, include the link between the second intermediate node 36 and third intermediate node 38, until the firmware upgrade has been distributed to the lowest-level intermediate node (e.g., the third intermediate node 38 in this example). From this point, the third intermediate node 38 transmits the data packets to the first meter 40 one at a time and receives acknowledgement signals, and then proceeds with transmitting to the second meter 42, third meter 44, and then the fourth meter 46. During the transfer of data packets, the utility provider 32 may record a status indication for each of the intermediate nodes. For example, while the utility provider 32 is transferring data packets to the first intermediate node 34, the utility provider may record the status of this node as being in the process of transmission or "active". When the firmware upgrade has been successfully transferred from one intermediate node to a next intermediate node, a signal may be forwarded up the hierarchy to the utility provider 32 to indicate that the one intermediate node has successfully forwarded the data. At this point, the utility provider 32 make record the status of this node as having completed the transfer. Similar signals can be sent up the hierarchy to the utility provider 32 to indicate other status information of the nodes and meters.

In this embodiment for distributing the firmware upgrade, the number of transmissions is reduced considerably compared to the other embodiment. Particularly, the number of transmission between the utility provider 32 and the first intermediate node 34 is reduced to 2,000, using the above assumptions. The number of transmissions between the first intermediate node 34 and second intermediate node 36 is reduced to 2,000; and the number of transmissions between the second intermediate node 36 and third intermediate node 38 is reduced to 2,000. The number of transmissions between the third intermediate node 38 and the meters 40, 42, 44, and 46 remains at 8,000. However, the total number of transmissions in this embodiment is 14,000, which is drastically reduced from the 32,000 transmissions needed in the previous example. Thus, by enabling the intermediate nodes to store the firmware upgrades, the number of transmissions can be reduced significantly, thereby reducing the amount of power needed by each of the nodes and also reducing the amount of time needed to transfer each firmware upgrade.

When firmware upgrades are provided over five intermediate nodes, for example, there is a large difference in the amount of time that the firmware upgrades can be deployed using different methods. In the first method in which the data packets hop from one node to the next from the utility provider to the meter, upgrading a large mesh network may take about 10 hours. However, according to the method in which all the data packets are transmitted from one intermediate node to another, and then all the data packets are transmitted from that intermediate node to a next, and so on, through the five intermediate nodes to the meters, the upgrading process might take about 20 minutes. Therefore, according to these estimates, the preferred second method provides a 96% improvement in upgrade time over the first method. This will allow more time for other communications, such as the normal reporting of meter measurements to the utility provider to maintain billing data. Additionally, because the number of overall transmissions is reduced, the likelihood of failed transmissions (which require retransmission) is also reduced, thereby increasing overall efficiency and reducing transmission time.

There may be at least two different types of firmware upgrade deployment scenarios. A first type of deployment is for heterogeneous mesh networks that might have a mix of line powered and battery powered nodes. This may also be referred to as a mixed network or a hybrid network comprising, for example, electric and water meters. A second type of deployment is for homogeneous mesh networks, such as those that have only one type of node, either line powered or battery powered.

It should be noted in FIG. 2 that transmission of data may occur in two different directions, from the top down (e.g., firmware upgrades) and from the bottom up (e.g., sensor data). In a firmware upgrade process, the utility provider 32 provides data packets one at a time to the first intermediate node 34, as depicted by the D1 arrow. The acknowledgement signal is sent in the direction of the U1 arrow. Likewise, the transmission of data packets from the first intermediate node N1 to the second intermediate node N2 is in the direction D2 and the acknowledgement signals are transmitted in the direction U2. Between the second intermediate node N2 and third intermediate node N3, there are downward transmissions D3 and upward transmissions U3. Between the third intermediate node and the meters 40, 42, 44, and 46 (assuming there are three intermediate nodes between the utility provider 32 and the meters), there are downward transmissions D4 and upward transmission U4.

For the firmware upgrades, the upward transmissions represent acknowledgement signals. However, for regular utility readings, the upward transmissions U4, U3, U2, and U1 include the forwarding process of the measurement data from the meters 40, 42, 44, and 46 up through the mesh network hierarchy to the utility provider 32. The firmware upgrades may include "quiet times" during which there is no transmissions among the components of the mesh network 30. Although the distribution of firmware upgrades may include quiet times, this should not preclude or disrupt the transmissions related to normal daily uploads of utility measurements. Instead, the firmware upgrade communication may be discontinued or paused to allow for the communication of utility measurements. In some embodiments, the quiet times may be intermingled with quiet times of the normal uploads to allow for simultaneous communication of utility measurements and firmware upgrades.

Figure 3:
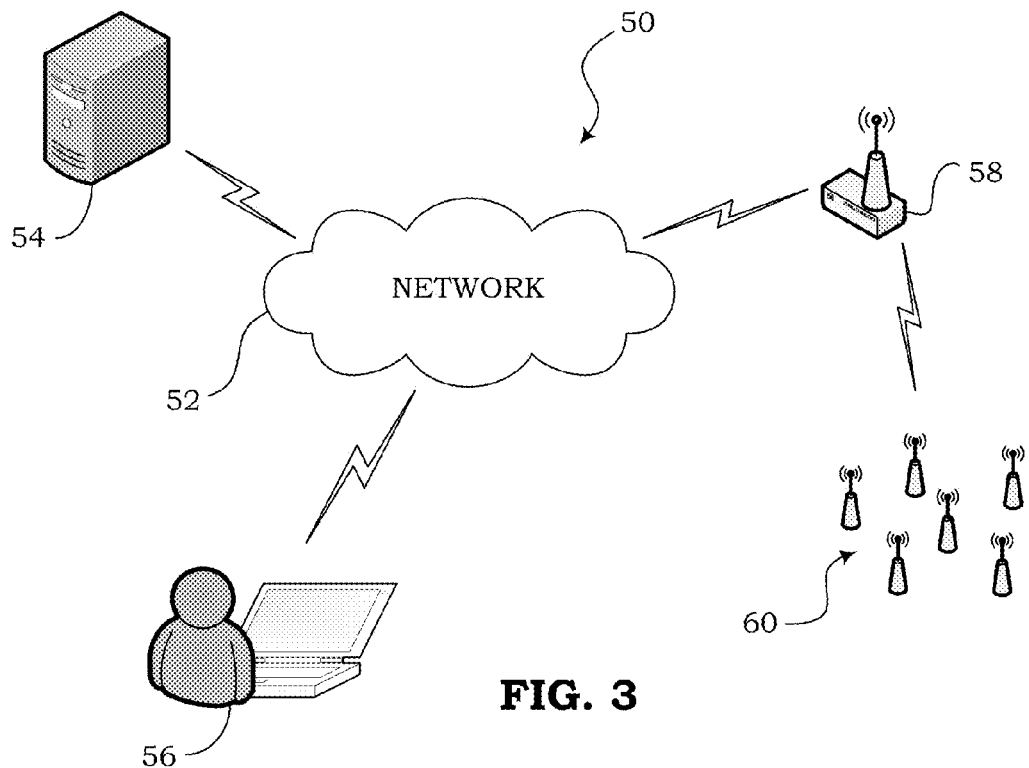
FIG. 3 is a block diagram illustrating a firmware distribution system according to various implementations of the present disclosure.

FIG. 3 is a diagram showing an embodiment of a system 50 for initiating a release of a firmware upgrade or otherwise transferring large amounts of data. The system 50 according to this embodiment includes a network 52, a server 54, a user 56, and a hub 58. The hub 58 is in wireless communication with a plurality of nodes 60. The server 54 may represent a computer server that is associated with a utility provider, such as utility provider 12 shown in FIG. 1 or utility provider 32 shown in FIG. 2. The hub 58 may also be associated with or represent the utility provider and may represent a top level parent of the mesh network hierarchy. The hub 58 therefore may be configured to distribute firmware upgrades to a first level of intermediate nodes 60 for further distribution to other intermediate nodes ultimately down to the meter level.

According to the implementation of FIG. 3, the user 56 may represent an employee or contractor of the utility provider. For instance, the user 56 may be responsible for the development and/or distribution of firmware upgrades. The server 54 may be configured to store utility records of the utility customers and may also be configured to store firmware designed for the various meters throughout a mesh network. When a firmware upgrade is needed and the user 56 initiates the distribution of the upgrade, the server 54 sends the appropriate upgrade message via the network 52 to the hub 58. The hub 58 may then distribute the upgrade to the various intermediate nodes as needed. The upgrade then passes through the various intermediate nodes as described above with respect to FIGS. 1 and 2 until the proper upgrades are distributed to the meters scheduled to receive the upgrades.

Figure 4:
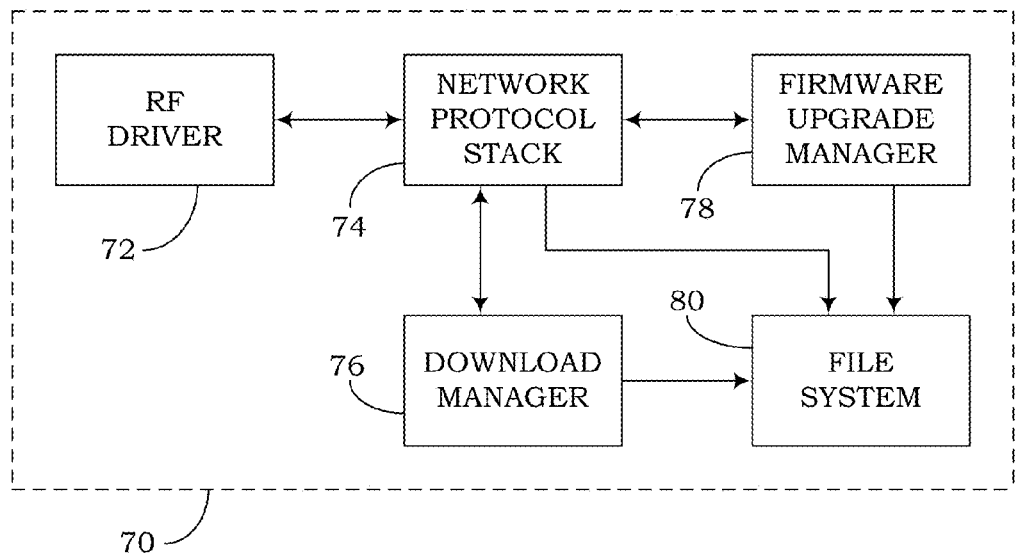
FIG. 4 is a block diagram illustrating an intermediate node of an AMI mesh network according to various implementations of the present disclosure.

FIG. 4 is a block diagram illustrating an embodiment of an intermediate node 70, which may represent any one or more of the intermediate nodes shown in FIGS. 1 and 2. In this implementation, the intermediate node 70 comprises an RF driver 72, a network protocol stack 74, a download manager 76, a firmware upgrade manager 78, and a file system 80. The RF driver 72 is responsible for transmitting and receiving RF data to the parent and child (or children) of the respective intermediate node 70. The RF driver 72 obtains data from the network protocol stack 74 and handles the physical layer encoding, integrity checking, and RF channel management.

The network protocol stack 74 is configured to support link, mesh, and other layers of a protocol stack. The network protocol stack 74 may support various message processing, routing and RF link/connection management. The network protocol stack 74 and RF driver 72 exchange data as needed.

The download manager 76 may be responsible for handling requests from the network to begin and/or manage the forwarding of a firmware image (message). More generally, any file, not only firmware image files, can be pushed through the network in this fashion. The download manager 76 splits the file up into smaller blocks of data, or data packets, which can be transmitted through the mesh network via the network protocol stack 74. The download manager 76 may be configured to use either a preconfigured list of nodes or a list provided in the request itself to determine the child nodes to which the files are scheduled to be forwarded. The download manager 76 may also be responsible for sending status information about the download process back to the utility provider, hub 58, or other host. The status information may be available to the user 56 for monitoring how the firmware upgrade or other file distribution process is progressing.

The firmware upgrade manager 78 may be responsible for burning (i.e., transferring) the received firmware image file (firmware upgrade) to local program memory within the respective intermediate node 70. The process of burning may include storing electronic files in memory (e.g., ROM, PROM, EPROM, EEPROM, etc.) or configuring processor switches within a processing or controlling device of the node. The firmware upgrade manager 78 may also initiate the transmission of a "burn complete" message, such as an acknowledgement signal, up through the hierarchy to the utility provider or host. This message informs the user 56 that the respective intermediate node 70 has been upgraded successfully and may be prepared to forward the file to its respective children. The message may also list the name of the firmware image file or message that was installed, in order to verify that the proper file was stored in the correct node.

The file system 80 of the intermediate node 70 is configured to store data files (e.g., data packets of firmware upgrades) in non-volatile memory (e.g., DFLASH). The memory may be large enough to store only one firmware upgrade at a time. In one of the examples above, the size of a firmware upgrade file may be about 128 kilobytes; thus, the file system 80 may be configured to store a file of about this size or slightly larger. After the firmware upgrade file has been passed along to the next node, the file stored in memory of the file system 80 may not be needed and may be deleted. Alternatively, the file stored in memory of the file system 80 may be passed along to another node for upgrading that node's firmware. Otherwise, the file may be overwritten when a new firmware upgrade is forwarded through the respective intermediate node. Files may be created, read, written, and deleted in the file system 80.

In some embodiments, each intermediate node 70 may also be configured with a voltage monitoring device that is configured to monitor the voltage level of a power supply providing power to the respective node. The node may receive power from a set of batteries and/or from electrical power lines. If the voltage level is determined to be below a predetermined threshold level, the intermediate node 70 may pause the forwarding process via the RF driver 72 until the voltage level returns to above the predetermined threshold level.

FIGS. 5-11 are screen shots illustrating various embodiments of user interfaces, which may be accessible by or associated with the user 56 shown in FIG. 3. The user interfaces may be used to enable the user 56 to initiate and monitor the status of firmware upgrade distributions. The user interfaces may allow the user 56 to see the sequence of steps involved in a firmware upgrade and view the status of some or all of the nodes. It should be noted that only a user 56 having the proper authority (e.g., an administrator of the utility provider) is given the right to initiate and monitor a firmware upgrade within the mesh network.

Figure 5:
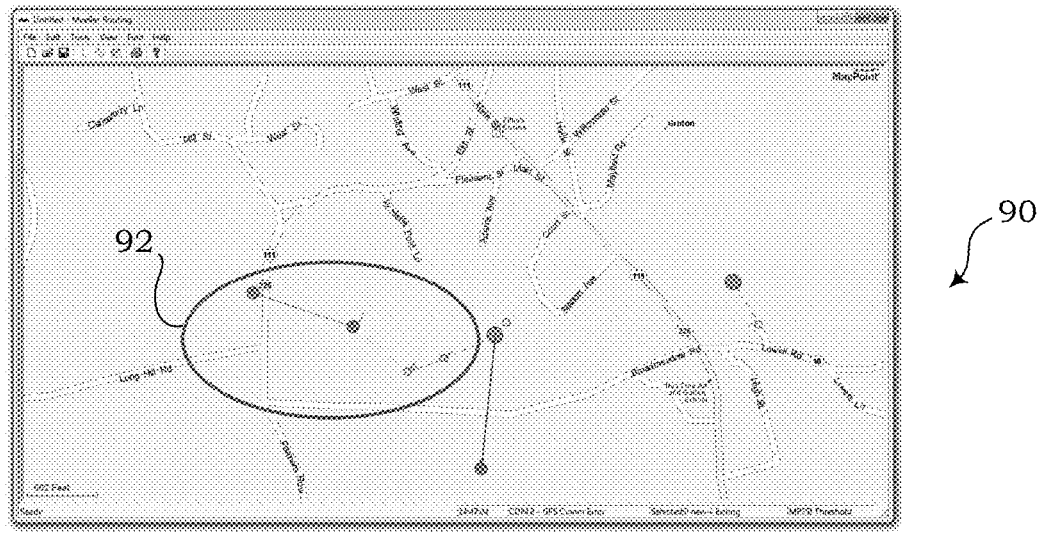
FIG. 5 is a first screen shot illustrating a user interface according to various implementations of the present disclosure.

FIG. 5 illustrates an embodiment of a user interface 90 that displays a map of a geographical region where customers may receive utility services from the utility provider. By controlling the map display, the user can perform various functions such as zooming in, zooming out, and panning around to view different areas of the effective utility region. As shown in FIG. 5, the view of the user interface 90 may show streets and street names. Also, the user interface 90 may show the location of meters and nodes within the system. When a desired area is shown, the user may manipulate the user interface 90 in such a way to select a portion of the meters and/or nodes in the viewable display. For example, an oval 92 may be dragged using a dragging tool (e.g., mouse) to a certain shape to select the four meters shown inside the oval 92. Other meters may be selected for inclusion with the group of nodes that is scheduled to receive a firmware upgrade.

The meters and nodes may be designated using any type of indication criteria. For example, the meters and/or nodes may be shown as circles, squares, or other shapes. Also, various shapes may designate various types of nodes or meters. The shapes may also be illustrated using different colors to represent the particular status of the meter or node. For example, one color (e.g., yellow) may represent that two components are in the process of transmitting data between them. Another color (e.g., red) may represent components that are waiting for a transmission. During the forwarding processes described in the present disclosure, the various nodes may send status updates up the hierarchy to the host (e.g., the utility provider). The status updates, for example, may indicate which nodes are currently involved in data communications, which nodes have successfully completed data communications, and which nodes have experiences errors transferring data. As the sequence of transmission is monitored by status updates from the various nodes, the user interface 90 may be configured to update the display to show a new status of the components. The status may be updated may be performed on a periodic basis.

Figure 6:
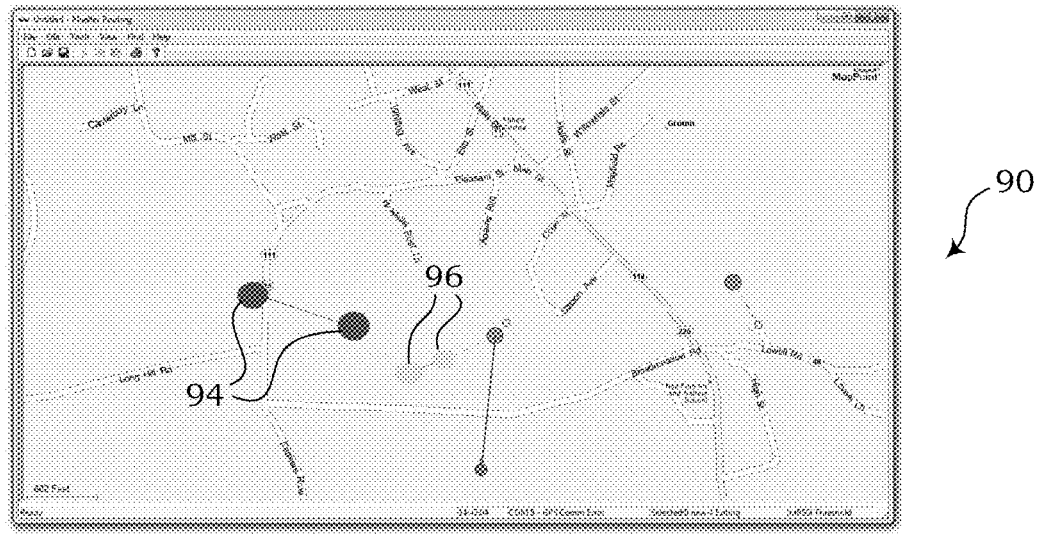
FIG. 6 is a second screen shot illustrating the user interface shown in FIG. 5 according to various implementations of the present disclosure.

FIG. 6 is a second screen shot illustrating the user interface 90. As shown, two meters 94 originally within the selected area (e.g., oval 92) may be shown in one manner (e.g., colored red) and two other meters 96 in this area may be shown in another manner (e.g., colored yellow). In this case, the meters 94 may be waiting for transmission, while meters 96 are in the process of transmitting data between the two of them.

Figure 7:
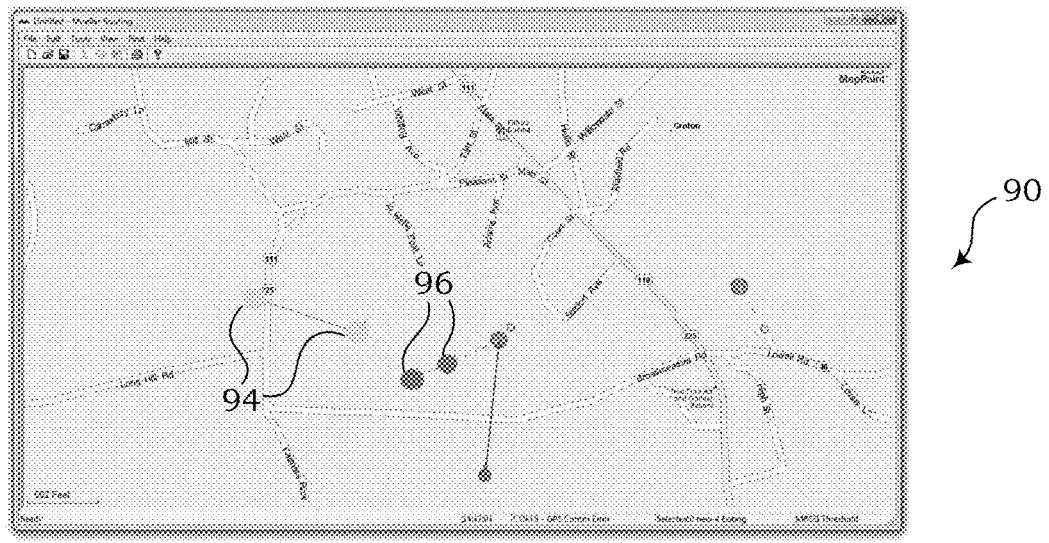
FIG. 7 is a third screen shot illustrating the user interface shown in FIG. 5 according to various implementations of the present disclosure.
Figure 8:
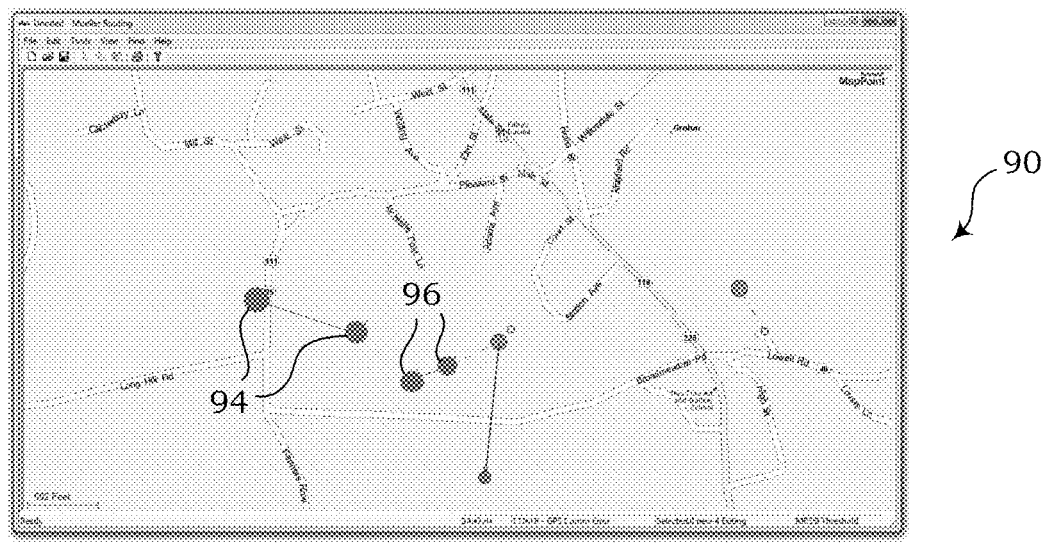
FIG. 8 is a fourth screen shot illustrating the user interface shown in FIG. 5 according to various implementations of the present disclosure.

After a certain amount of time, the user interface 90 will be updated to show the view illustrated in FIG. 7. In this view, after meters 96 have completed their transmission, the meters 96 are then shown with a new status (e.g., colored green) to indicate that transmission is complete. Meters 94 may be shown at this time using a status to indicate that transmission is occurring between them (e.g., colored yellow). Finally, in FIG. 8, the user interface 90 shows the originally selected meters 94 and 96 in a completed status (e.g., green) to indicate that transmission has been completed.

For example, when the transmission includes the distribution of firmware upgrades, the status of the meters can be seen. When the meters have received the firmware files, further processing (e.g., burning into memory) may occur if necessary. The user interface 90 may also be configured to indicate (e.g., using a different color) when a transmission has been attempted but failed. Another status may indicate that a meter has received the firmware upgrade and has been instructed to burn the upgrade to memory and yet another status may indicate when the meter has actually burned (i.e., transferred) the upgrade into memory.

Figure 9:
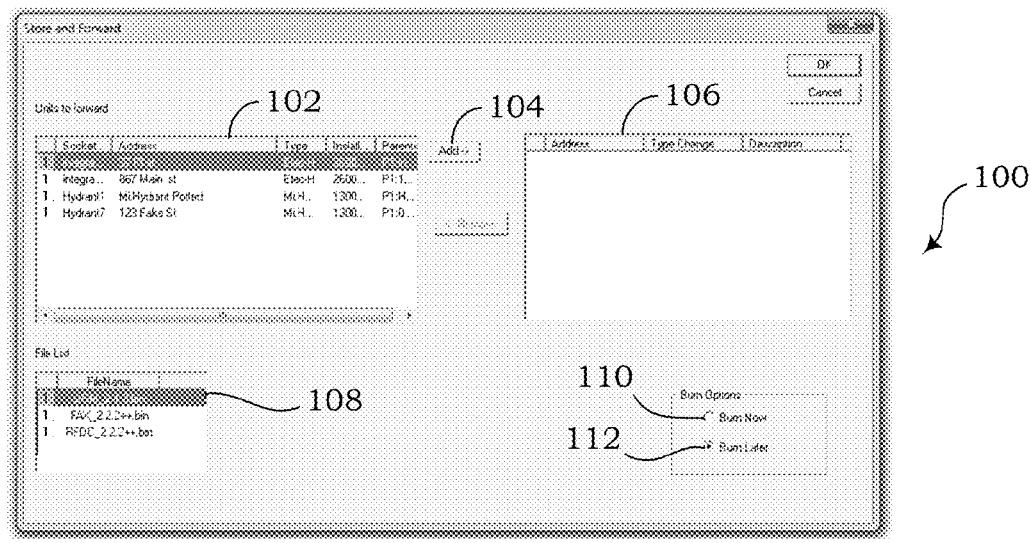
FIG. 9 is a screen shot illustrating a second user interface according to various implementations of the present disclosure.

FIG. 9 is another screen shot illustrating an embodiment of another user interface 100. The user interface 100 may be displayed to the user 56 to provide a menu of options that the user 56 may select to initiate the firmware upgrade sequence. Before the user interface 100 is displayed, the user 56 may be given an option to perform a firmware upgrade by any suitable software prompt, menu option, etc. Selected meters (e.g., the meters selected by the processes described with respect to FIG. 5) may be shown in box 102 with an identification number and an address. The box 102 may also display the type of meter, installation baud rate, and other parameters of the selected meters. By selecting a meter from box 102 and clicking the Add button 104, the user 56 may select one or more meters, which the user interface 100 can display in box 106. The user interface 100 may also include a File List box 108 from which a distribution file may be selected. The selected file may be the file (e.g., firmware upgrade) that is to be distributed to the selected meters in box 106. The user interface 100 also includes radio buttons regarding burn options. For example, a first radio button 110 may be selected if it is desired that the file is immediately burned into memory of the selected node/meter and a second radio button 112 may be selected if it is desired that the file is burned into memory at a later time. For example, the second radio button 112 (i.e., the Burn Later button) may be the default. A message may be forwarded to the selected node/meter to indicate whether the file is to be burned into memory now or later. The message, for example, may be processed by the download manager 76 or firmware upgrade manager 78 to either wait to burn at a later time (until further notice) or to go ahead and initiate a burn process.

The user interface 100 may be configured to allow the user to sort the meters appearing in either the box 102 or box 106 by using the "Type" column. For example, various types may include DCom2, DCom3, UGM, Fax, Polyphase, Singleboard, Hydrant, and Bridge. These types might represent various types of meters or nodes and even the location of various nodes positioned on various landmarks. Boxes 102 and 106 may also include a column to indicate whether a meter or node is used with electric meters, water meters, gas meters, or other types of meters. Another column may be included to indicate the number of intermediate nodes (i.e., number of hops) between a meter and the utility provider. In some embodiments, another column may be included for defining the complete path from the utility provider (e.g., collector) to the respective meter, identifying each of the intermediate nodes between the collector and meter. In some embodiments, a column may be provided to identify only the parent node of the respective meter. Additional columns may be added as understood by one of skill in the art.

In some embodiments, certain types of nodes may not allow certain firmware upgrades to be stored or forwarded. For example, if a node (e.g., a polyphase or DCom2 unit) does not have the capability of storing a forwarded firmware upgrade, the user interface 100 may be configured to indicate an error when the user selects a meter that might depend on such an intermediate node for receiving the upgrade.

Additionally, the user interface 100 may be configured to check whether a firmware upgrade is being selected for forwarding to a meter of a wrong type. For example, an electric meter may be improperly selected for an upgrade that might only be intended for water meters. If this is the case, an error message will be displayed and the system will not attempt to send the file to this meter.

Figure 10:
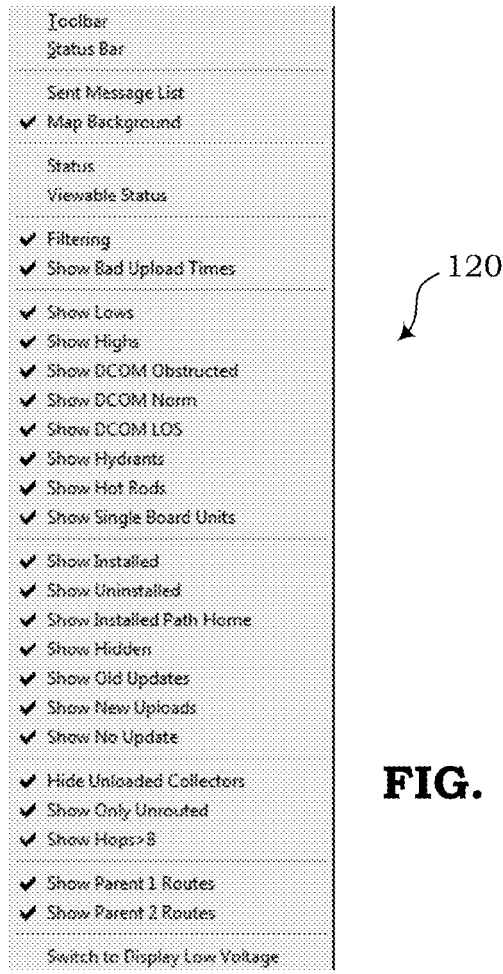
FIG. 10 is a screen shot illustrating a third user interface according to various implementations of the present disclosure.

FIG. 10 is a screen shot illustrating an embodiment of a menu 120 of a user interface according to various implementations. Using this menu 120, the user 56 may be able to filter by type, such as Singleboard, Hydrants, etc. This allows the user 56 to easily select only the units of interest to be displayed. If the user 56 selects the "burn later" button, another dialog box may be displayed to initiate when the file is to be burned and may display the units waiting for the go-ahead to start burning. The upgrades could also be burned in memory when the user right-clicks on the particular meter in one of the display lists and selects the burn options.

Figure 11:
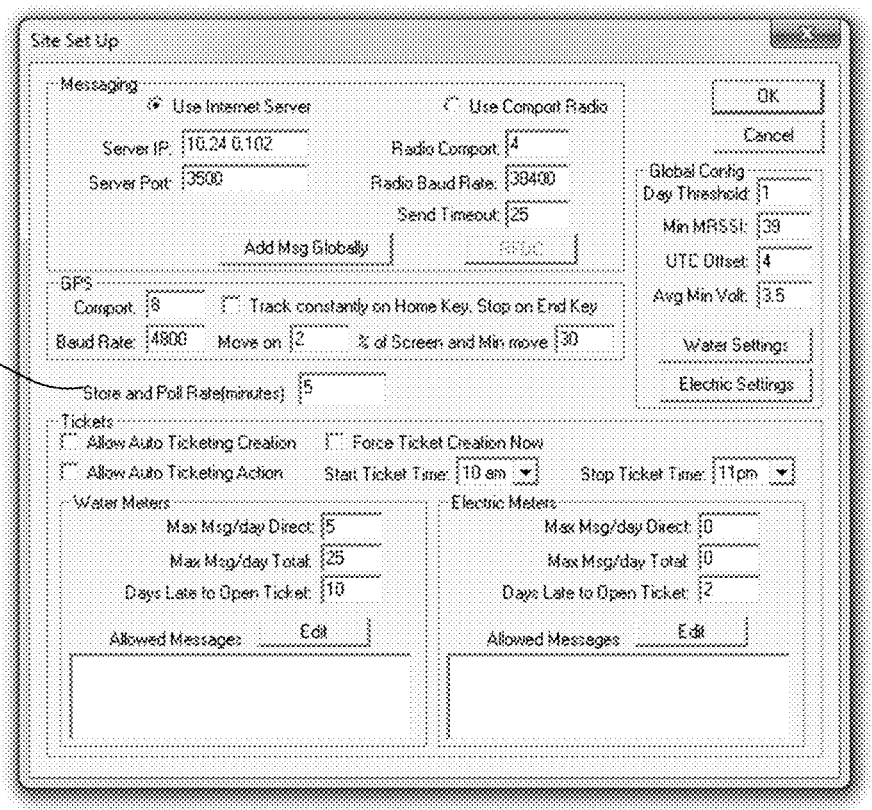
FIG. 11 is a screen shot illustrating a fourth user interface according to various implementations of the present disclosure.

FIG. 11 is a screen shot illustrating an embodiment of another user interface 130. The user interface 130 in this embodiment may be used to enable various control functions for the system. For instance, the user 56 may be able to set the timeout rate when the main view is displaying the firmware upgrade being distributed. When the system is in a mode where the status of firmware upgrades is being displayed, a "Store and Poll Rate" time 132 may be used to set the amount of time between polling the meters to determine any changes in status. In this example, this parameter is set at 5 minutes.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

The invention claimed is:

1. A system comprising:
a utility provider configured to provide utility services to a plurality of customers;
a plurality of meters, each meter configured to measure utility usage data of a respective customer; and
a plurality of intermediate nodes configured to transmit the utility usage data from the plurality of meters to the utility provider,
wherein, when at least one of the plurality of meters is scheduled to receive a firmware upgrade, the utility provider is configured to forward the firmware upgrade to at least one of the plurality of intermediate nodes,
wherein the at least one of the plurality of intermediate nodes is configured to receive and store the firmware upgrade and, after storing the firmware upgrade, is further configured to forward the firmware upgrade to at least one of the plurality of meters,
wherein each intermediate node comprises a voltage monitoring device configured to monitor a voltage level of a power supply providing power to the respective intermediate node, and
wherein, if the voltage monitoring device determines the voltage level to be below a predetermined threshold level, the respective intermediate node pauses the forwarding process until the voltage level returns to above the predetermined threshold level.

2. The system of claim 1, wherein the at least one of the plurality of intermediate nodes is further configured to forward the firmware upgrade to at least one other of the plurality of intermediate nodes.

3. The system of claim 2, wherein the plurality of intermediate nodes repeats the forwarding of the firmware upgrade until the firmware upgrade is forwarded to a lowest-level intermediate node in a hierarchy comprising the utility provider, intermediate nodes, and meters.

4. The system of claim 1, wherein the utility provider is further configured to divide the firmware upgrade into a plurality of data packets before forwarding the firmware upgrade to the at least one of the plurality of intermediate nodes.

5. The system of claim 4, wherein the utility provider is configured to forward one data packet at a time to the at least one of the plurality of intermediate nodes.

6. The system of claim 5, wherein, in response to receiving a data packet, the at least one of the plurality of intermediate nodes transmits an acknowledgement signal back to the utility provider.

7. The system of claim 5, wherein the at least one of the plurality of intermediate nodes is configured to store the firmware upgrade one data packet at a time.

8. The system of claim 7, wherein the at least one of the plurality of intermediate nodes is configured to forward the firmware upgrade to the at least one of the plurality of meters after storing the entire firmware upgrade comprising each of the data packets.

9. The system of claim 4, wherein each data packet comprises about 100 bytes of data and the firmware upgrade comprises about 128 kilobytes of data.

10. The system of claim 4, wherein each data packet comprises about 100 bytes of data and the firmware upgrade comprises about 256 kilobytes of data.

11. The system of claim 1, wherein each intermediate node comprises a radio frequency (RF) driver configured to wirelessly communicate with at least one of the utility provider, at least one other intermediate node, and at least one meter.

12. The system of claim 11, wherein each intermediate node further comprises a network protocol stack, a download manager, a firmware upgrade manager, and a file system.

13. The system of claim 1, wherein the utility provider comprises a server configured to communicate with a hub via a communication network, the hub configured to forward the firmware upgrade to the at least one of the plurality of intermediate nodes.

14. The system of claim 13, further comprising a user device in communication with the server via the communication network, the user device configured to initiate a firmware upgrade process.

15. The system of claim 14, wherein the user device comprises a user interface enabling a user to select at least one of the meters to receive the firmware upgrade.

16. The system of claim 15, wherein the user interface displays a status of the firmware upgrade process.

17. The system of claim 15, wherein the user interface enables the user to select various parameters of the firmware upgrade process.

18. A method for storing and forwarding data, comprising:
    receiving from a first node a plurality of data packets comprising a data package;
    storing each of the data packets in a memory;
    sending an acknowledgement upon receiving each of the plurality of data packets;
    monitoring a voltage level of a power supply; and
    in response to receiving a final data packet of the data package and sending a final acknowledgement, sending to a second node the plurality of data packets stored in the memory,
    wherein if the voltage level is determined to be below a predetermined threshold level, pausing the process of sending the plurality of data packets to the second node until the voltage level returns to above the predetermined threshold level.

19. The method of claim 18, wherein receiving from the first node the plurality of data packets comprises receiving the data packets one at a time, and wherein sending to the second node the plurality of data packets comprises sending the data packets one at a time.

20. The method of claim 18, wherein the data package is a firmware upgrade.

21. A system for storing and forwarding data, comprising:
    a processing device configured to execute logic instructions;
    a voltage monitoring device configured to monitor a voltage level of a power supply providing power to the system; and
    a memory device in communication with the processing device, the memory device configured to store a set of logic instructions enabling the processing device to
        receive from a first node a plurality of data packets comprising a data package,
        store each of the plurality of the data packets,
        send an acknowledgement upon receiving each of the plurality of data packets, and
        in response to receiving a final data packet of the plurality of data packets and after sending a final acknowledgement, send to a second node the plurality of data packets stored in the memory device,
    wherein if the voltage monitoring device determines the voltage level to be below a predetermined threshold level, the processing device causes the process of sending the plurality of data packets to the second node until the voltage level returns to above the predetermined threshold level.

* * * * *